United States Patent [19]

Wark

[11] Patent Number: 4,989,400
[45] Date of Patent: Feb. 5, 1991

[54] DISPOSABLE BAG AND MOUNTING APPARATUS FOR A LAWN MOWER

[75] Inventor: David L. Wark, Germantown, Tenn.

[73] Assignee: Snapper Power Equipment, Division of Fuqua Industries, Inc., McDonough, Ga.

[21] Appl. No.: 401,924

[22] Filed: Sep. 1, 1989

[51] Int. Cl.$^5$ .............................................. A01D 53/06
[52] U.S. Cl. ........................................ 56/202; 383/42
[58] Field of Search ................................. 56/202–206, 56/13.4, 16.1, 16.6; 383/42–45, 100–103

[56] References Cited

U.S. PATENT DOCUMENTS

| | | | |
|---|---|---|---|
| 2,774,402 | 12/1956 | Wikle | 383/102 |
| 3,133,396 | 5/1964 | Leader | 56/202 |
| 3,144,197 | 8/1964 | Milner et al. | 383/45 |
| 3,183,653 | 5/1965 | Cromwell | 56/16.6 X |
| 3,421,302 | 1/1969 | Dahl | 56/202 |
| 3,492,800 | 2/1970 | Peterson et al. | 56/202 |
| 3,874,152 | 4/1975 | Dahl | 56/202 |
| 3,890,772 | 6/1975 | Seifert et al. | 56/202 |
| 3,916,608 | 11/1975 | Garrison | 56/202 |
| 3,928,956 | 12/1975 | Boyer | 56/202 |
| 3,952,484 | 4/1976 | Van Swearingen | 56/302.2 X |
| 3,971,198 | 7/1976 | Lane | 56/16.6 X |
| 4,030,273 | 6/1977 | Leader | 56/202 X |
| 4,095,398 | 6/1978 | Aumann et al. | 56/16.6 X |
| 4,149,363 | 4/1979 | Woelffer et al. | 56/202 |
| 4,186,546 | 2/1980 | Machado et al. | 56/202 |
| 4,233,806 | 11/1980 | Richardson | 56/202 |
| 4,251,982 | 2/1981 | Skaja et al. | 56/202 |
| 4,345,418 | 8/1982 | Arizpe | 56/202 |
| 4,377,063 | 3/1983 | Leaphart | 56/206 X |
| 4,413,467 | 11/1983 | Arizpe | 56/11.3 |
| 4,444,002 | 4/1984 | Heismann et al. | 56/202 |
| 4,505,095 | 3/1985 | Short, Sr. | 56/202 |
| 4,566,257 | 1/1986 | Akrabawl | 56/202 |
| 4,747,259 | 5/1988 | Kline et al. | 56/202 |
| 4,848,070 | 7/1989 | Berglund | 56/202 |

Primary Examiner—Thuy M. Bui
Attorney, Agent, or Firm—William E. Mouzavires

[57] ABSTRACT

A disposable bag for collecting grass clippings or the like has ventilation holes in only a portion of its surface. The bag has a narrow mouth mounted to a connector assembly, or, alternatively, directly to a discharge chute of a mower. The disposable bag is supported by a cradle assembly mounted to the handlebars of the mower.

23 Claims, 12 Drawing Sheets

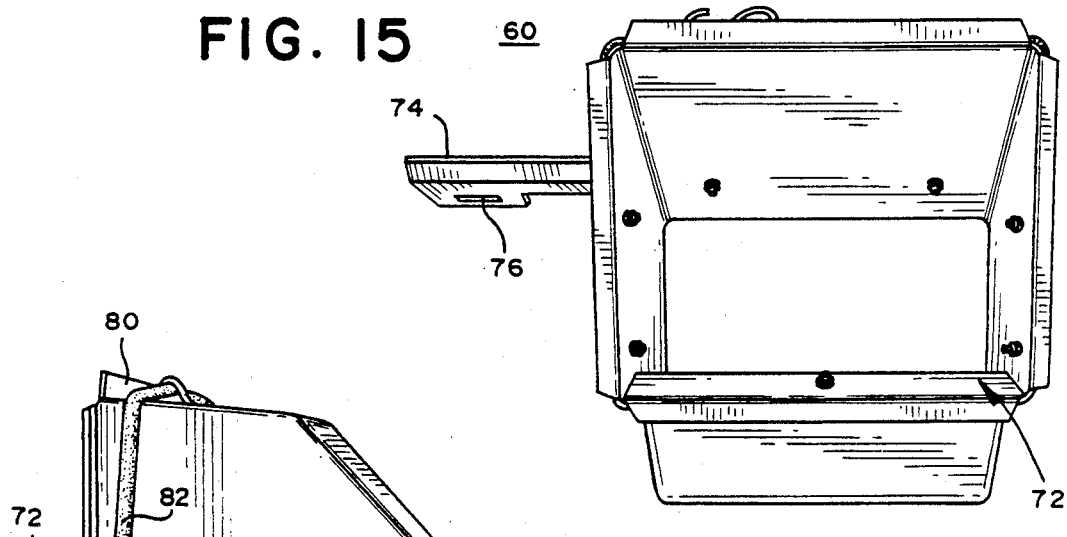
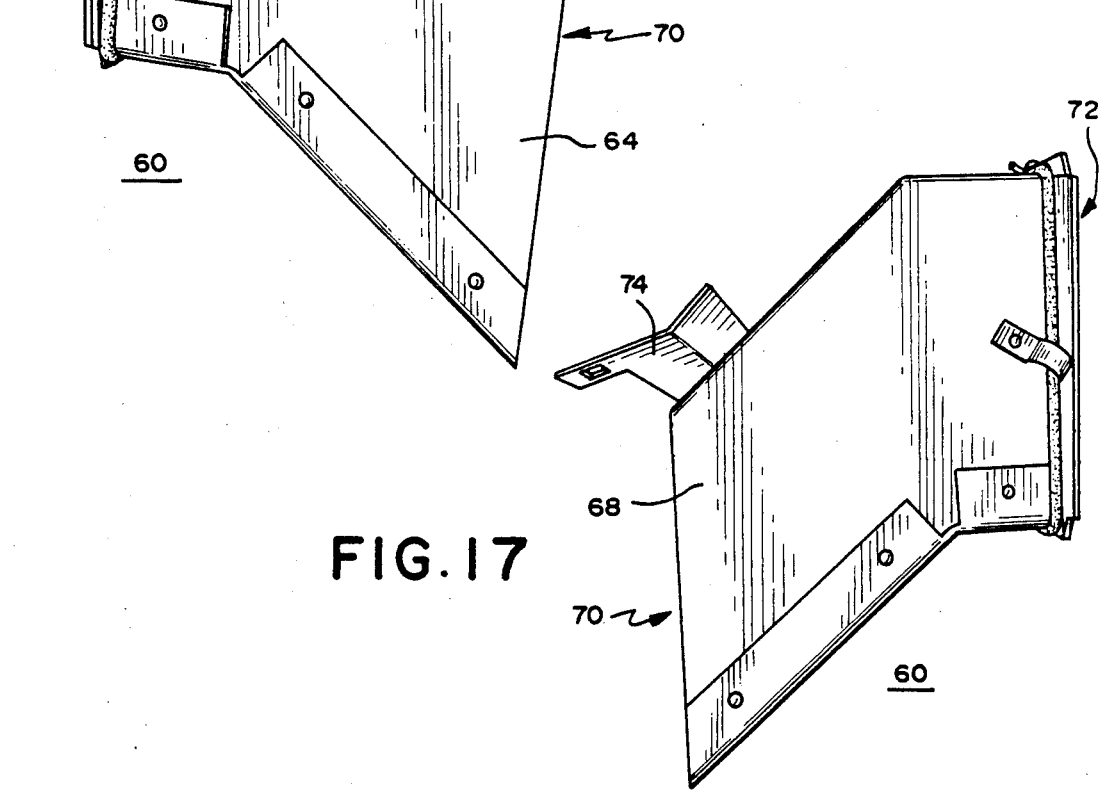

DISPOSABLE BAG AND MOUNTING APPARATUS FOR A LAWN MOWER

BACKGROUND OF THE INVENTION

The present invention relates to disposable bags and, more particularly, to a disposable bag and mounting apparatus for mounting the disposable bag to a lawn mower or other debris collecting device.

The present invention is applicable not only to lawn mowers, but also to any exhausting devices which cut, mulch, or collect a product and create either refuse or by-product which needs to be stored or disposed of.

A number of devices are known in the art for collecting grass clippings in a disposable bag in order to reduce the amount of labor involved in collecting, bagging, and disposing of grass clippings or the like.

One known device is disclosed in U.S. Pat. No. 4,186,546 to Machado et al. That patent discloses a disposable bag with ventilating holes.

Another device is disclosed in U.S. Pat. No. 4,030,273 to Leader. That patent discloses a lawn mower equipped with a bagging chute for delivering grass clippings to a disposable plastic or paper bag having air ventilating holes. The mouth of the bag is attached to the chute with a cord, and the bottom of the bag is supported by a platform which is an extension of the chute housing.

Another device is disclosed in U.S. Pat. No. 4,251,982 to Skaja et al. That patent discloses a grass catching accessory attachable to a rotary power lawn mower, the device including a basket in which a plastic trash can liner is placed and a box shaped spout mounted to the mower having a tubular mouthpiece around which the bag mouth is fitted.

Those devices suffer from a number of defects preventing their commercial success. Among other problems, those known bags have ventilation holes which permit collected debris to fly into the face of an operator of the device.

Accordingly, it is an object of the present invention to provide a disposable bag that is easier to handle and which suppresses dust and other debris which would otherwise interfere with the operator of the device while at the same time providing adequate breathing characteristics.

Another object is to use the mower's own handlebars to support the disposable bag.

Another object is to provide a disposable bag made of transparent or translucent material so that the user may observe the grass collection process and determine when the bag has been filled to capacity in order to know with certainty when to change the bag and thus avoid overfilling and grass buildup and congestion in the mower.

Still another object is to provide a connecting device which conforms and attaches in a stable fashion to the discharge chute of the lawn mower or other exhausting device.

Another object is to provide a connecting device which redirects the airflow coming out of the exhausting device discharge chute in order to provide optimum air path characteristics to ensure that the disposable bag fills from the back of the bag to the front of the bag in an even and distributive fashion.

Still another object is to provide a connector which enhances and amplifies airflow to promote efficient filling and packing in the disposable bag.

Another object of the present invention is to provide a supporting apparatus for the disposable bag which includes a protective barrier between the bag and the user, which barrier "breaths" so as not to suppress the venting function of the disposable bag.

Another object is to provide a supporting device which flexes as the exhausting device passes over rough ground and which can also bend to accommodate storage of the exhausting device when, for example, the user pivots the exhausting device handlebars forward over the device when not in use.

Additional objects and advantages of the invention will be set forth in the description which follows and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the present invention, as embodied and broadly described herein, there is provided a bag comprising a first closed end having a width, and an opposite open mouth having a width smaller than the first closed end width.

There is also provided a connecting device for connecting a disposable bag to an exhausting device having a discharge port, comprising first, second, third, and fourth side walls connected to each other to define a passageway having opposite first and second end openings for passing airflow and entrained material from the first end opening to the second end opening; first mounting means fixed to at least one side wall for mounting the connecting device to the exhausting device; and second mounting means for mounting the disposable bag to the connecting device in communication with the second end opening, wherein the second end opening is larger than the first end opening.

The accompanying drawings, which are incorporated in and constitute a part of this specification, illustrate embodiments of the invention and, together with the description, serve to explain the principles of the invention.

BRIEF DESCRIPTION OF THE DRAWINGS

FIG. 15 is a rear view of one embodiment of the connector.

FIG. 16 is a right side view of the connector of FIG. 15.

FIG. 17 is a left side view of the connector of FIG. 15.

DETAILED DESCRIPTION OF THE PREFERRED EMBODIMENTS

Reference will now be made in detail to the present preferred embodiments of the invention as illustrated in the accompanying drawings.

Figure 1:
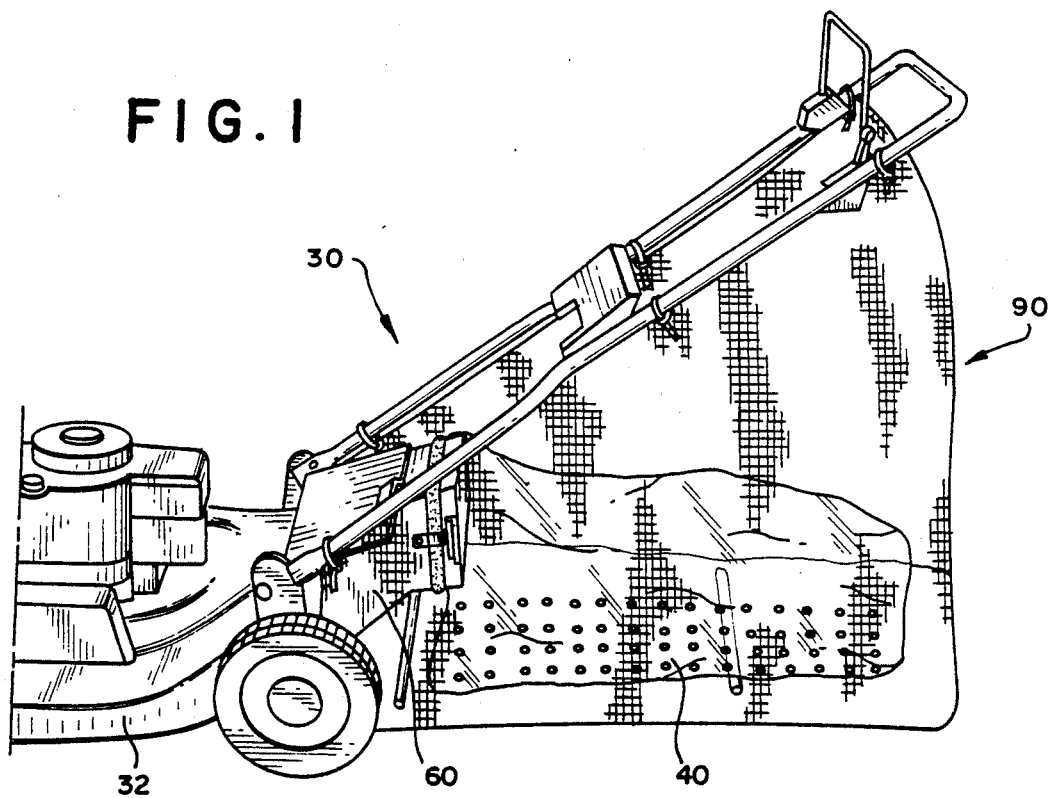
FIG. 1 is a left side view of the disposable bag collection system incorporating the teachings of the present invention showing a bag, cradle, and connector mounted on a lawn mower.
Figure 2:
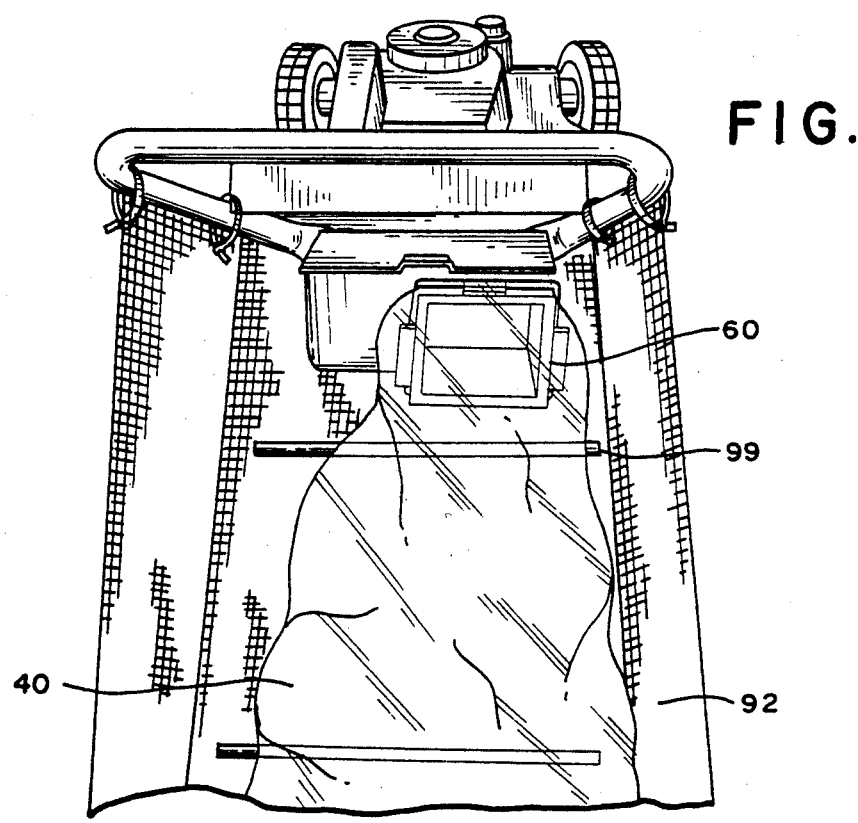
FIG. 2 is a rear view of the apparatus of FIG. 1.
Figure 3:
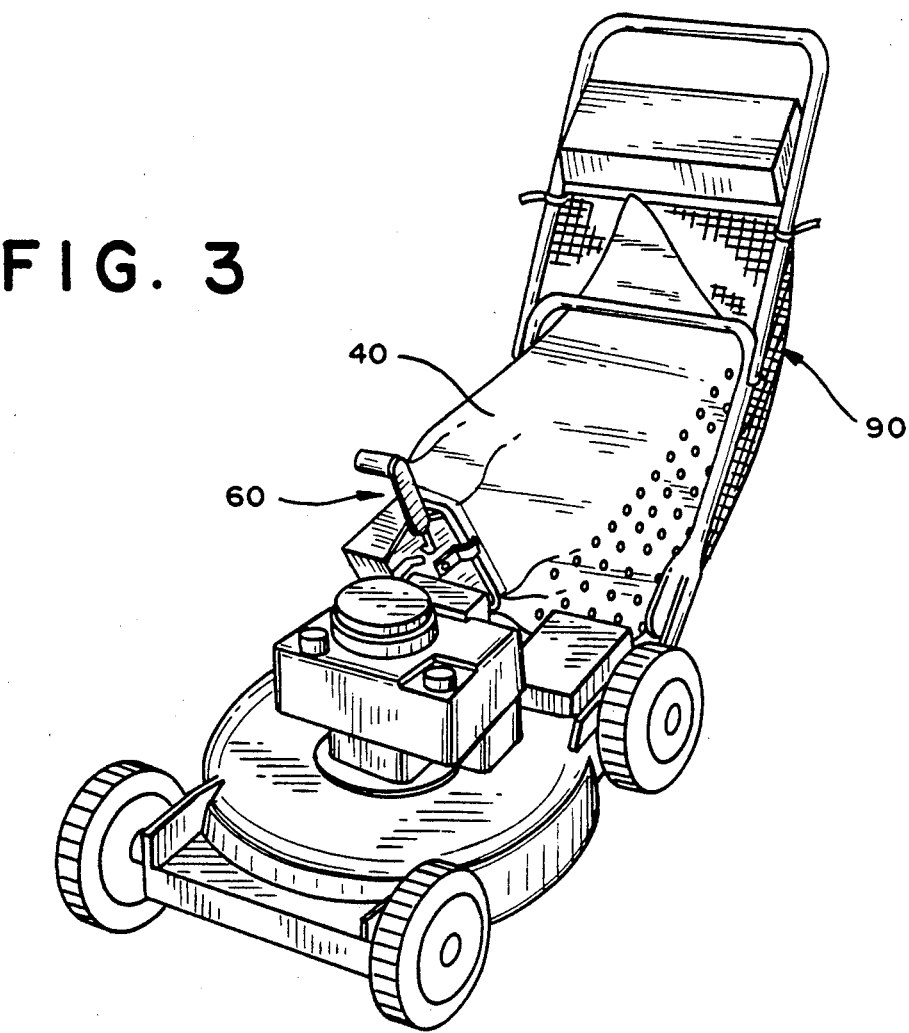
FIG. 3 is a perspective view of another embodiment of the bag, cradle, and connector of the present invention.

As shown in FIGS. 1-3, collection system 30 generally comprises disposable bag 40, connector assembly 60, and cradle assembly 90. The system is mounted to mower 32 as will be described in more detail below.

Figure 4:
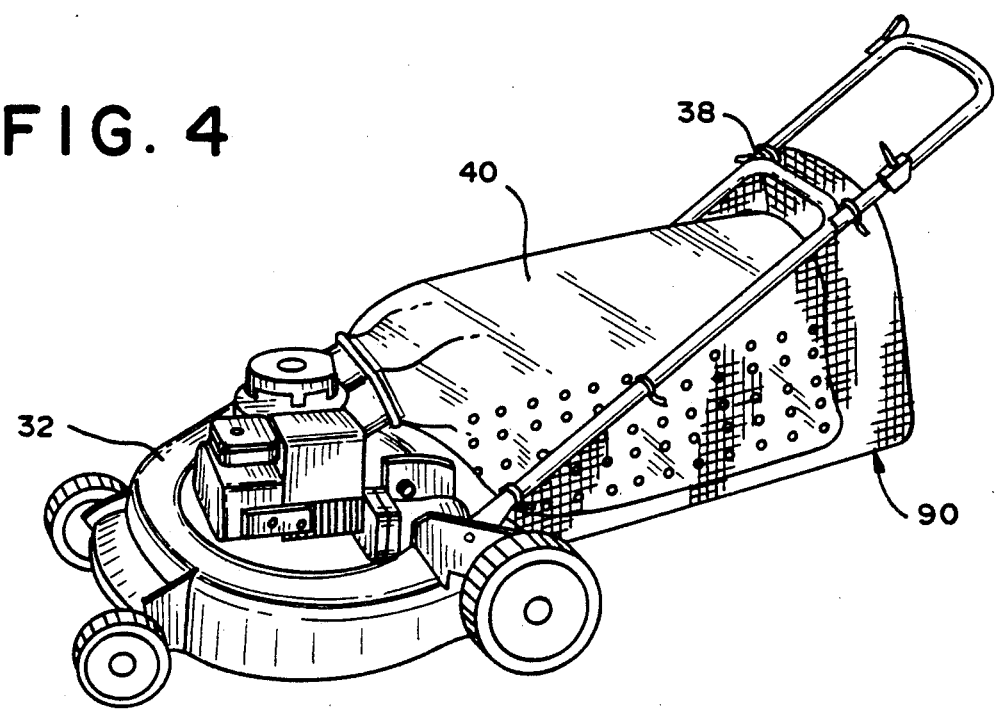
FIG. 4 is a perspective view of another embodiment of the bag and cradle of the present invention without the connector.
Figure 5:
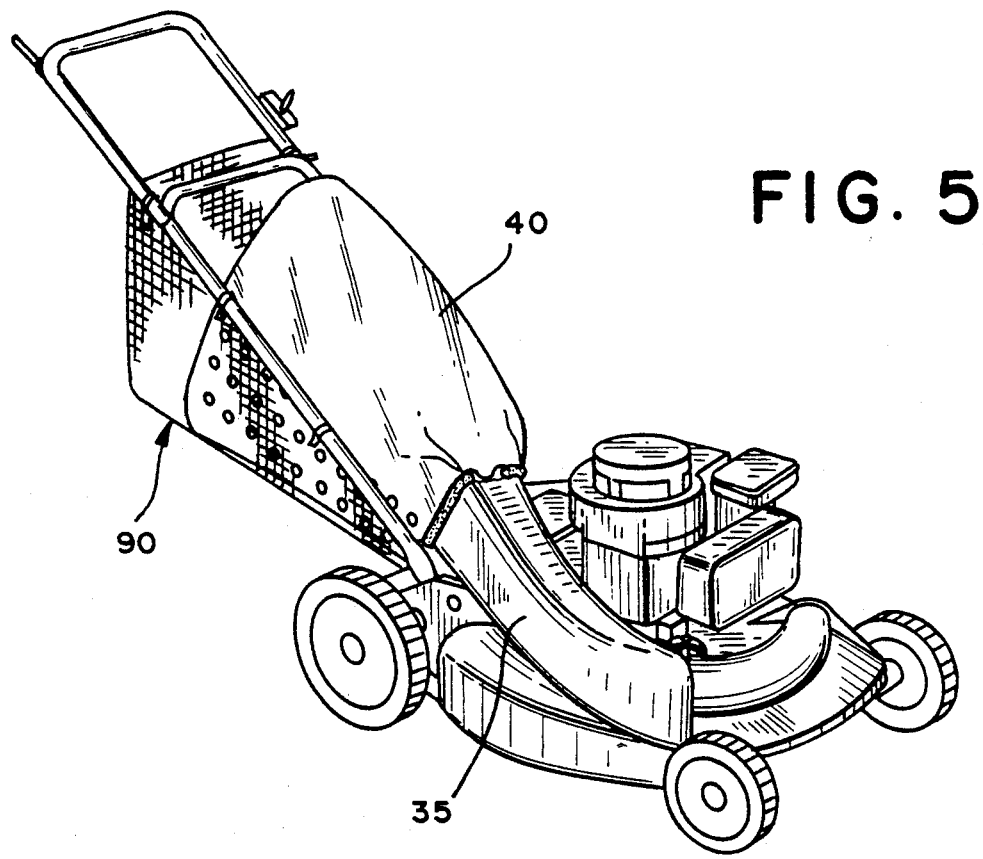
FIG. 5 is a perspective view of the apparatus of FIG. 4.
Figure 6:
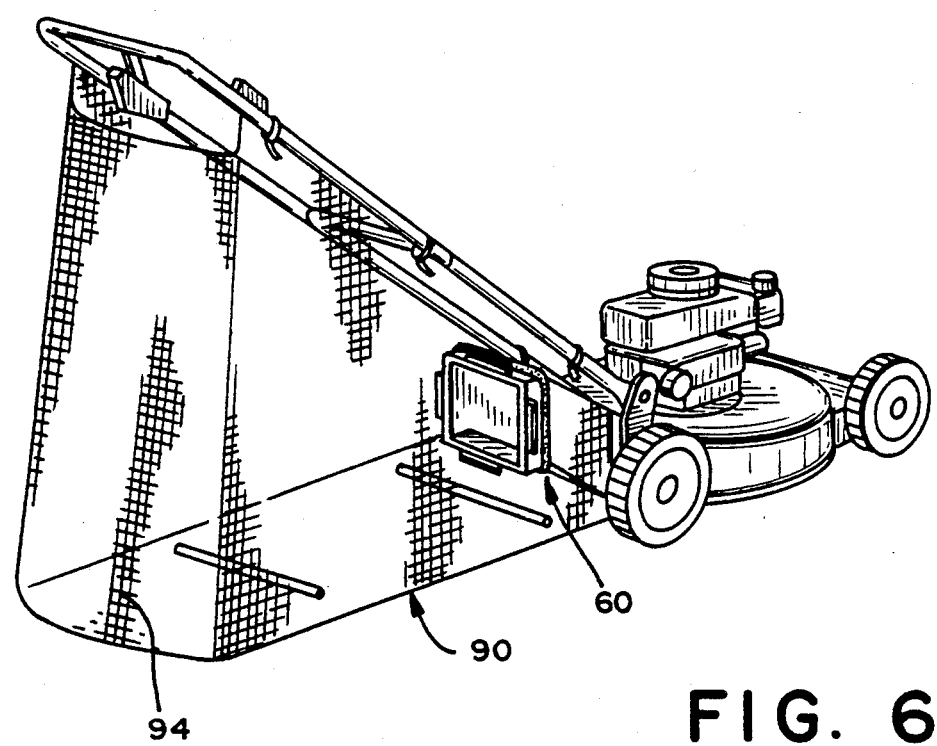
FIG. 6 is a perspective view showing the embodiment of FIG. 1 before attachment of the disposable bag.

Alternatively, depending on the brand and style of mower 32, disposable bag 40 and cradle assembly 90 may be mounted to mower 32 without using a connector assembly 60, as illustrated, for example, in FIGS. 4-5.

Figure 12:
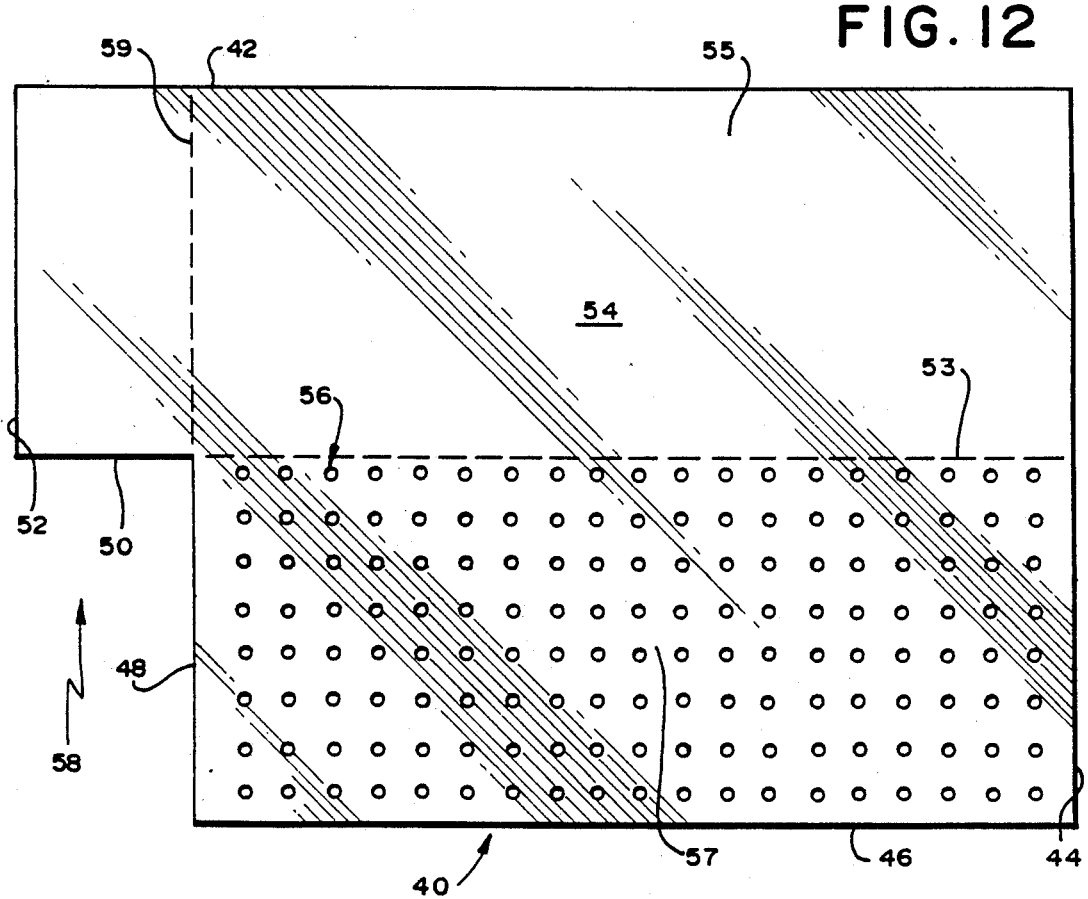
FIG. 12 is a side elevation of the disposable bag.

As illustrated in FIG. 12, disposable bag 40 includes a first closed end 44 and an opposite open mouth 52. Extending between first closed end 44 and open mouth 52 is first side edge 42. Second side edge 46 extends from first closed end 44 to second closed end 48. Third side edge 50 extends from second closed end 48 to open mouth 52. Bag surface 54 is provided with a plurality of ventilation holes 56. FIG. 12 illustrates one preferred embodiment of bag 40, showing one side of the bag in a flat state, that is, before it is attached to a mower.

Bag 40 has an opposite side which is substantially identical to the side illustrated in FIG. 12.

In one preferred embodiment, first side edge 42, second side edge 46 and third side edge 50 are substantially parallel to each other and perpendicular to first closed end 44. It is also preferred that first closed end 44, second closed end 48, and open mouth 52 be substantially parallel to each other. When bag 40 is installed on a lawn mower and is inflated in use by the air flow exhausted from mower 32 through discharge port 34 or discharge chute 35, bag 40 inflates so that surface 54 defines an ellipsoid as shown in FIGS. 3-5.

It is also preferred that bag surface 54 have at least two portions. Portion 55 is substantially impermeable to air and only the other portion 57 has ventilation holes 56.

In one preferred embodiment as illustrated, for example, in FIGS. 3-5 and 12, portion 57 extends only to about half of surface 54. That is, imaginary centerline 53 separates impermeable portion 55 from ventilated portion 57. In other preferred embodiments, ventilated portion 57 may extend somewhat beyond imaginary centerline 53.

Thus, when bag 40 is mounted on mower 32, impermeable portion 55 is facing the user and reduces the amount of dust and other debris which would otherwise escape from bag 40, while ventilated portion 57 provides adequate ventilation in order to properly fill bag 40 with grass clippings or other material.

In one preferred embodiment, ventilation holes 56 are about ⅜ inch in diameter and are spaced about 1 ½ inch apart center to center. The size of the holes may be larger or smaller by about ⅛ inch, and the between the holes may be greater or smaller by about ½ inch.

First closed end 44 has a width extending from first side edge 42 to second side edge 46, and open mouth 52 has a width extending from first side edge 42 to third side edge 50. It is preferred that the width of open mouth 52 is smaller than the width of first closed end 44. In one preferred embodiment, mouth 52 is about half as large as closed end 44. In one preferred embodiment, open mouth 52 is contiguous with first side edge 42. Alternatively, open mouth 52 may be spaced apart from first side edge 42 and may, for example, be centered on imaginary centerline 53 of bag 40.

Preferably, disposable bag 40 is made of transparent plastic and is two mils thick. Alternatively, bag 40 may be made of paper, cloth, vinyl or similar materials. In this context, the term "disposable" means intended to be used substantially one time on the exhausting device and then disposed of, as distinguished from bags intended for repetitive use on the exhausting device.

The geometric configuration illustrated in FIG. 12 is one preferred embodiment. Other geometric configurations may be used. In one preferred embodiment, first side edge 42 is 33 inches long and first closed end is 26 inches wide.

As illustrated in FIG. 12, third side edge 50 forms a neck 58 for bag 40. Neck 58 facilitates mounting on mower 32, and also reduces or eliminates the need for a tying device to close the bag after the bag is full of debris or other material. Moreover, neck 58 also serves as a convenient carrying handle when the bag is full. Neck 58 generally extends from mouth 52 to imaginary line 59, which is substantially colinear with second closed end 48.

Bag 40 is mounted to mower 32 either by mounting bag 40 directly onto a discharge chute 35, as illustrated in FIGS. 4-5, or by mounting bag 40 to a connector assembly 60 which will now be described.

Figure 7:
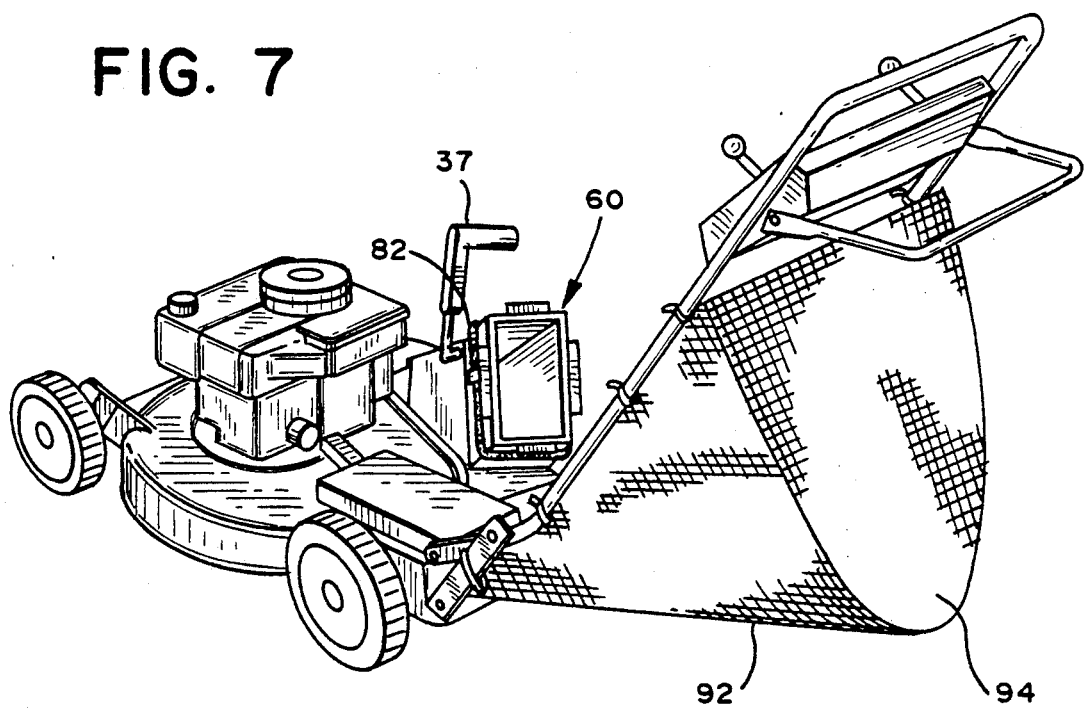
FIG. 7 is a perspective view showing the embodiment of FIG. 3 before attachment of the disposable bag.
Figure 8:
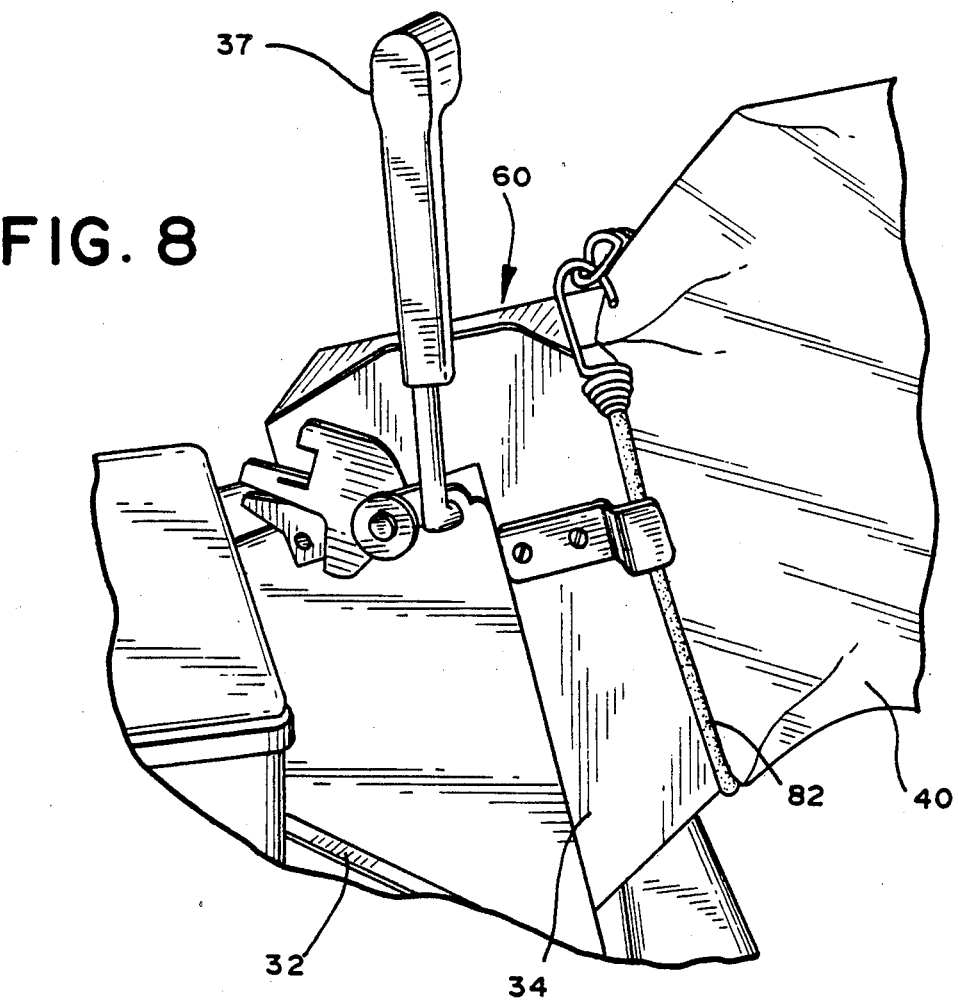
FIG. 8 is a detail view of the embodiment of FIG. 3 showing the disposable bag mounted on the connector and the connector mounted on a mower.
Figure 9:
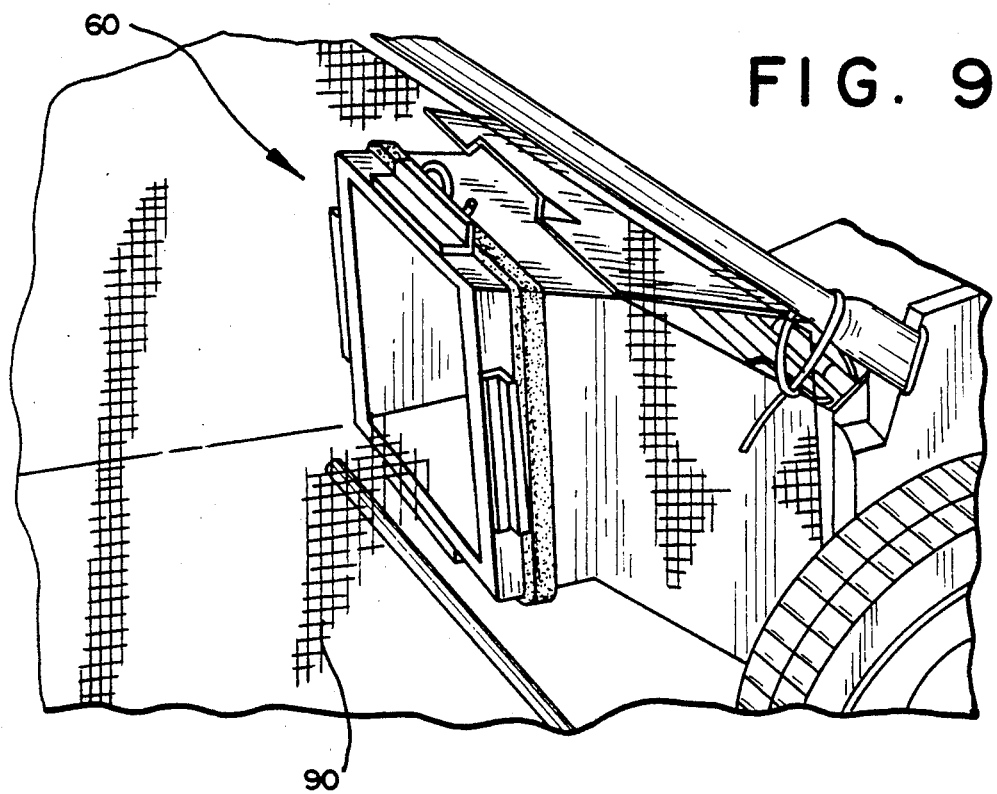
FIG. 9 is a detail view of the embodiment of FIG. 1 showing the cradle and connector mounted to the mower.

One embodiment of connector assembly 60 is illustrated in FIGS. 6 and 9-11. That embodiment is suitable for mower brands such as Sears and Honda. Another embodiment is illustrated in FIGS. 7-8, which is suitable for brands such as Toro. As illustrated in FIGS. 15-26, connecting device 60 includes first side wall 62, second side wall 64, third side wall 66, and fourth side wall 68 connected to each other to define a passageway. That passageway has first end opening 70 which communicates with a discharge port of mower 32, and second end opening 72 which communicates with open mouth 52 of disposable bag 40.

Figure 10:
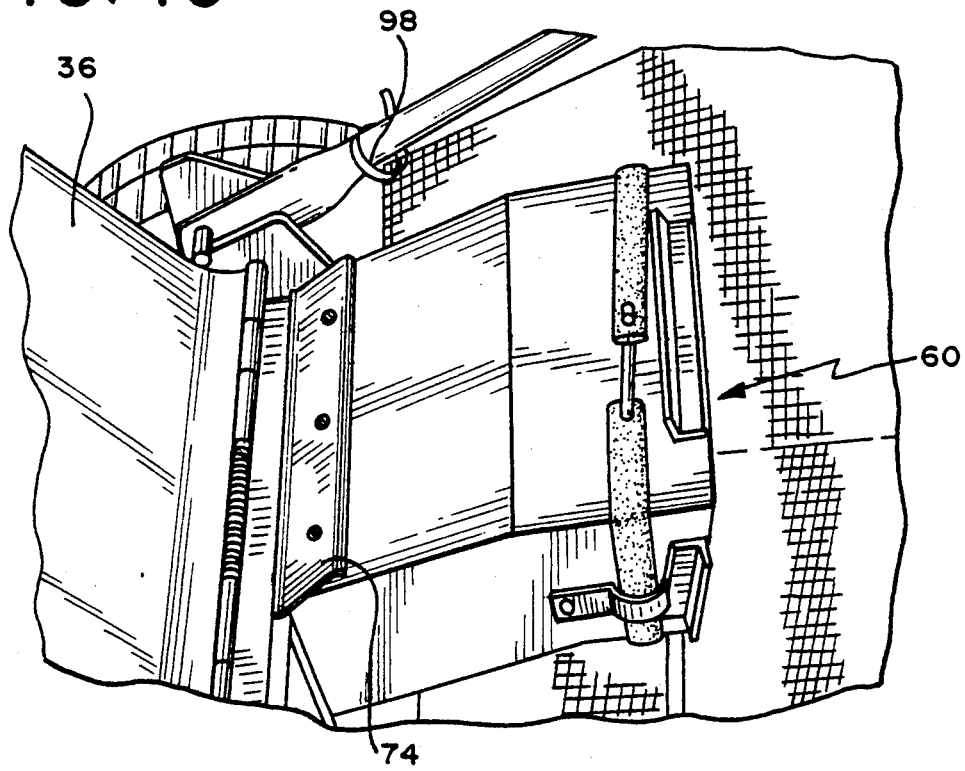
FIG. 10 is a detail view of the embodiment of FIG. 1 showing the connector mounted to the mower.
Figure 11:
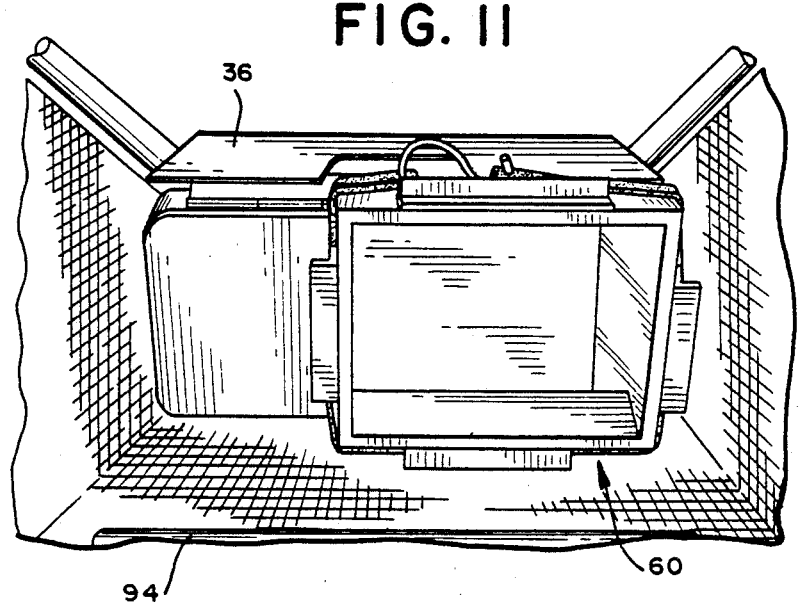
FIG. 11 is a rear view of the connector of FIG. 1 mounted on the mower.

In one preferred embodiment illustrated in FIGS. 15-20, connector assembly 60 includes mounting bar 74 with a plurality of mounting slots 76. As shown in FIG. 10, mounting slots 76 fit over mounting tabs provided on mower 32. Spring loaded mower cover plate 36 is opened to install connector assembly 60, as shown in FIG. 10, and is closed to retain connector assembly on the mounting tabs as shown, for example, in FIG. 9. Mounting bar 74 may be elongated as illustrated in FIGS. 15-20 for use with brands such as Honda, or it may be shortened as shown, for example, in FIG. 10 for use with brands such as Sears. The mounting means for one preferred embodiment includes mounting bar 74 and mounting slots 76.

Connector assembly 60 also includes second mounting means for mounting disposable bag 40 in communication with second end opening 72. As illustrated, for example, in FIGS. 15-26, second mounting means includes a plurality of mounting flanges 80, elastic cord 82, and retaining clips 84.

In one alternative embodiment, as illustrated, for example, in FIGS. 21-26, first mounting means includes a plurality of mounting side flaps 78. In that embodiment, mounting side flaps 78 are inserted into the discharge port of mower 32, and connector assembly 60 is retained in place by mower locking handle 37 as illustrated, for example, in FIGS. 3, and 7-8.

Figure 23:
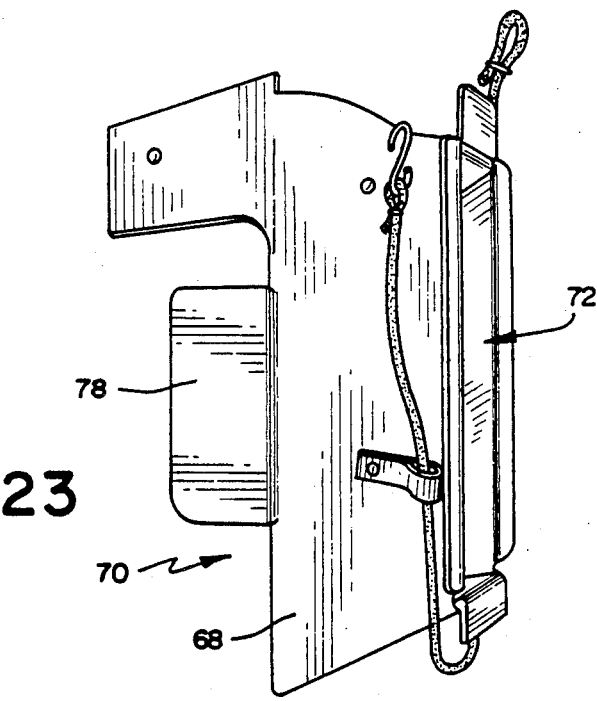
FIG. 23 is a left side view of the connector of FIG. 21.
Figure 24:
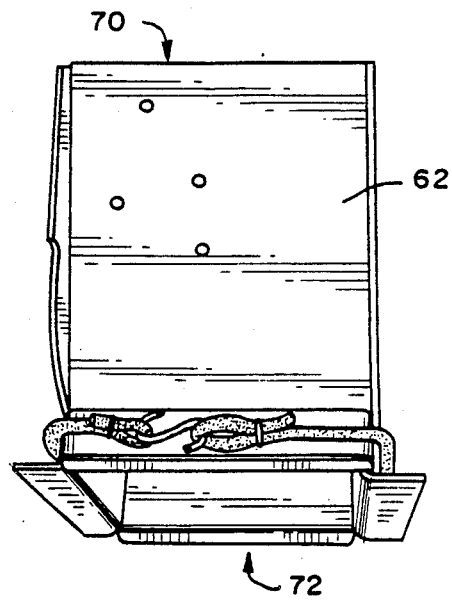
FIG. 24 is a top view of the connector of FIG. 21.
Figure 25:
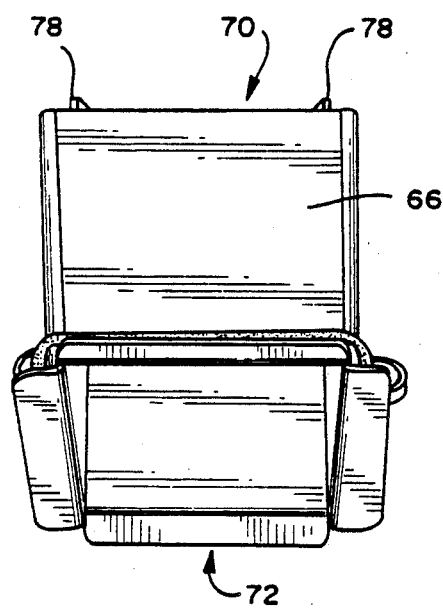
FIG. 25 is a bottom view of the connector of FIG. 21.
Figure 26:
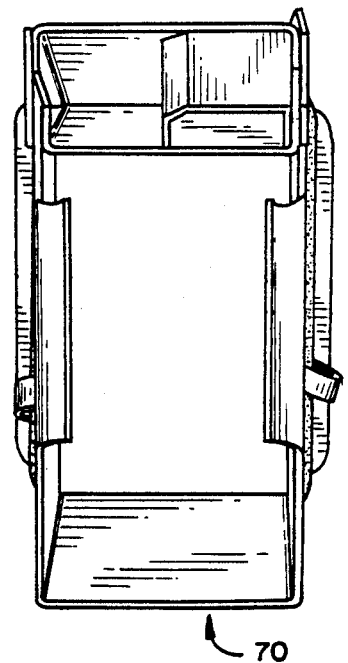
FIG. 26 is a front view of the connector of FIG. 21.
Figure 28:
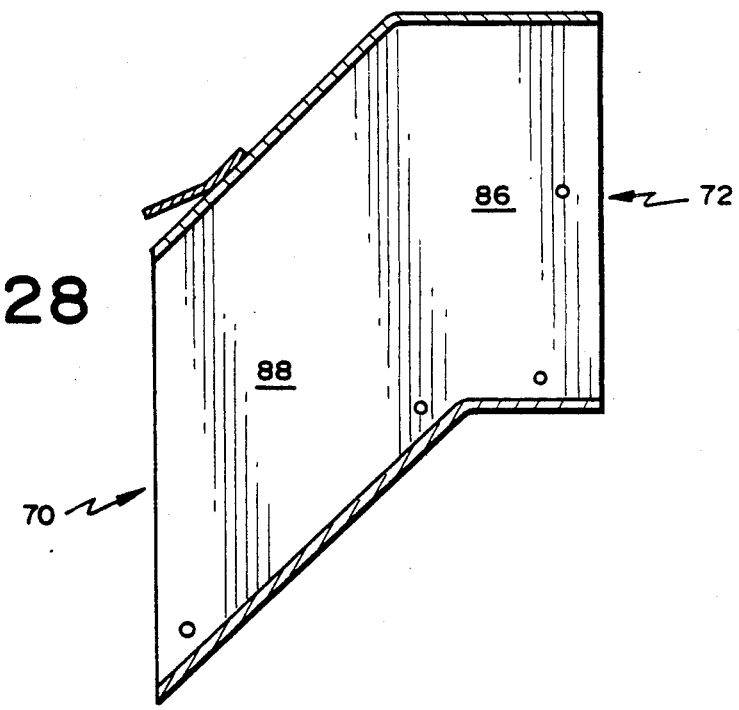
FIG. 28 a sectional view of FIG. 17 showing the inclined passageway for redirecting airflow.

Second end opening 72 defines a plane, and the passageway defined by side walls 62, 64, 66, and 68 is inclined with respect to that plane as shown, for example, in FIGS. 17 and 23. Preferably, the angle of inclination is approximately 45°, although it may be somewhat larger or smaller. The passageway may be inclined substantially uniformly from second opening 72 to first opening 70 as illustrated, for example, in FIG. 23. Alternatively, as illustrated, for example, in FIGS. 17 and 28, the passageway may also include a portion 86 substantially normal to that plane in addition to inclined portion 88.

Figure 13:
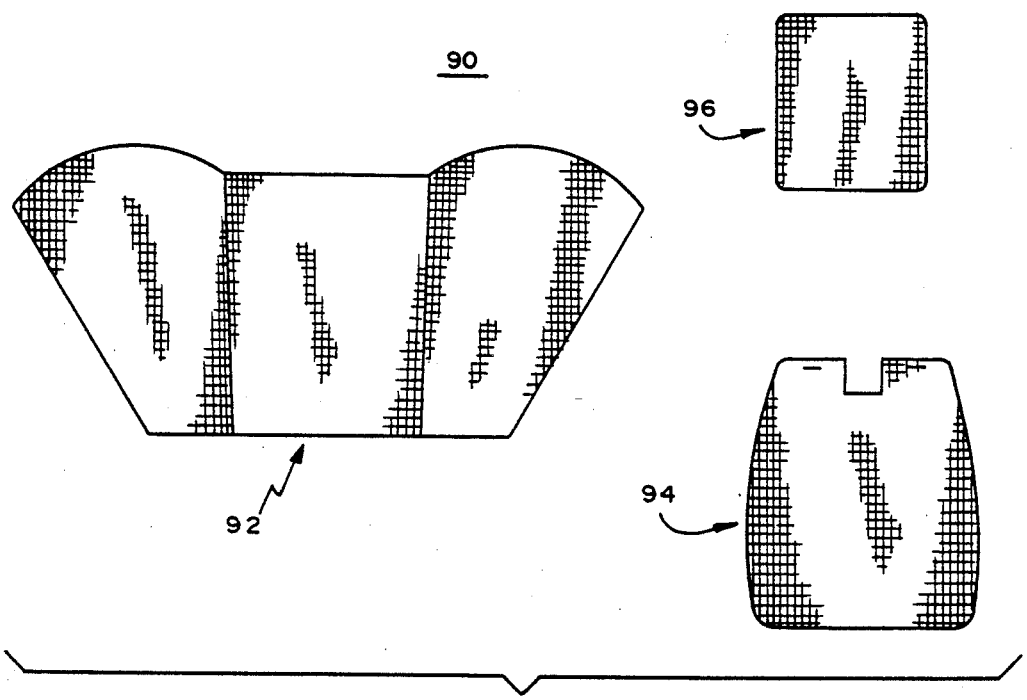
FIG. 13 is a schematic view of one embodiment of the cradle, showing the main panel, top panel, and back panel.
Figure 14:
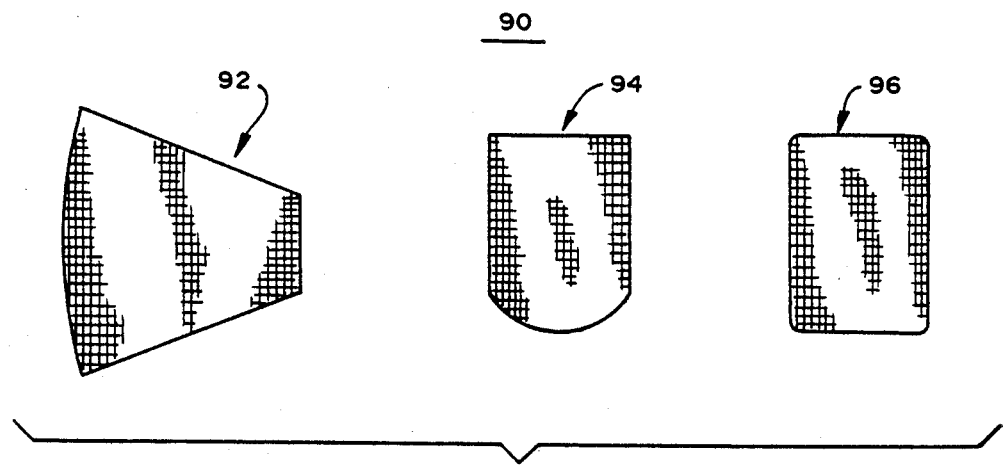
FIG. 14 is a schematic view of another embodiment of the cradle, showing the main panel, top panel, and back panel.
Figure 18:
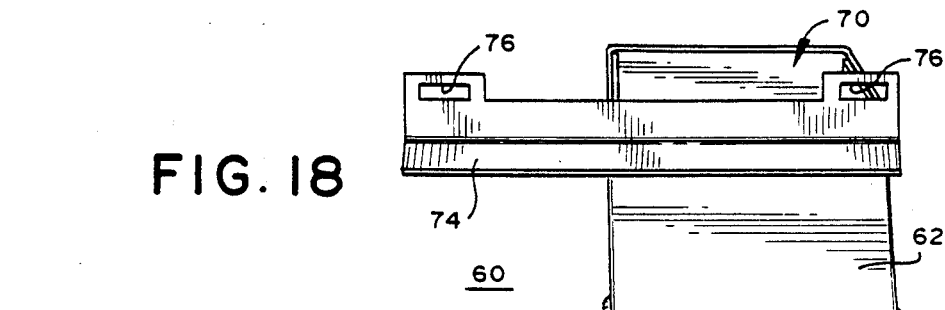
FIG. 18 is a top view of the connector of FIG. 15.
Figure 19:
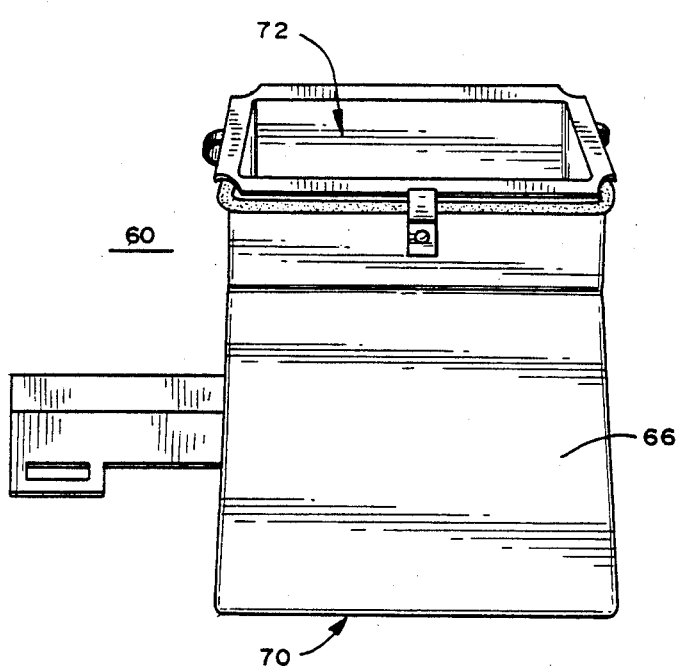
FIG. 19 is a bottom view of the connector of FIG. 15.
Figure 20:
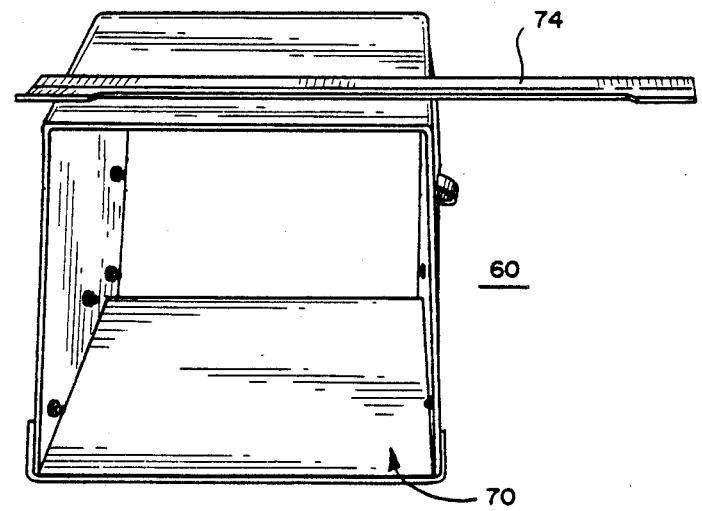
FIG. 20 is a front view of the connector of FIG. 15.
Figure 21:
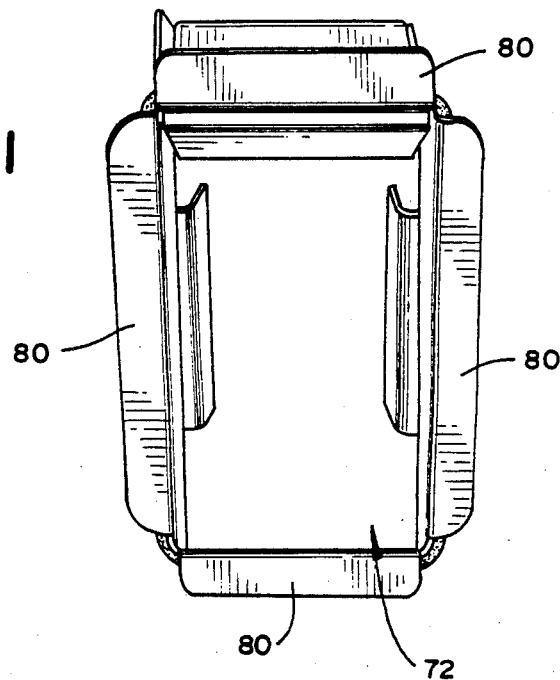
FIG. 21 is a rear view of another embodiment of the connector.
Figure 22:
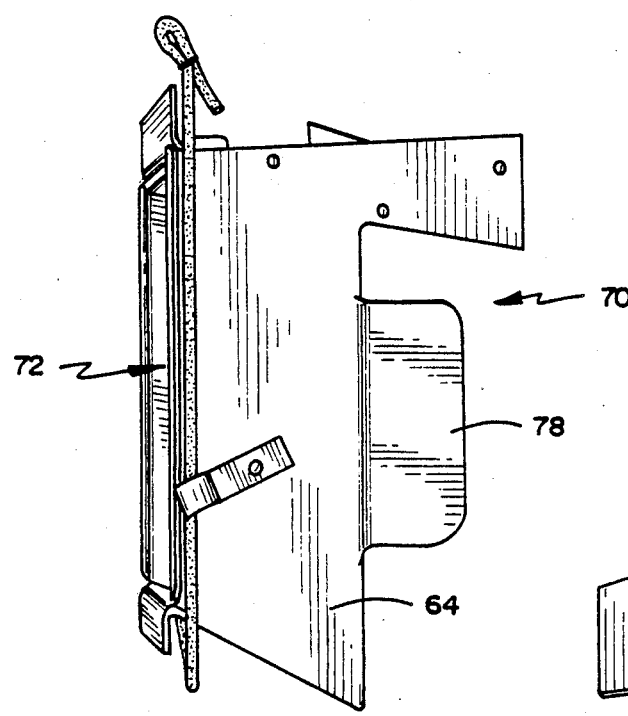
FIG. 22 is a right side view of the connector of FIG. 21.

Disposable bag 40 is supported by cradle assembly 90. As illustrated in FIGS. 13 and 14, cradle assembly 90 has three principal components, main panel 92, back panel 94, and top panel 96. Suitable devices such as nylon ties 98 are used to fasten those panels to each other and to mower handlebars 38. Spacing rods 99 are fastened to the underside of main panel 92 to flatten out the bottom of main panel 92 so it may support and ensure adequate space for inflated disposable bag 40 without dragging on the ground.

Figure 27:
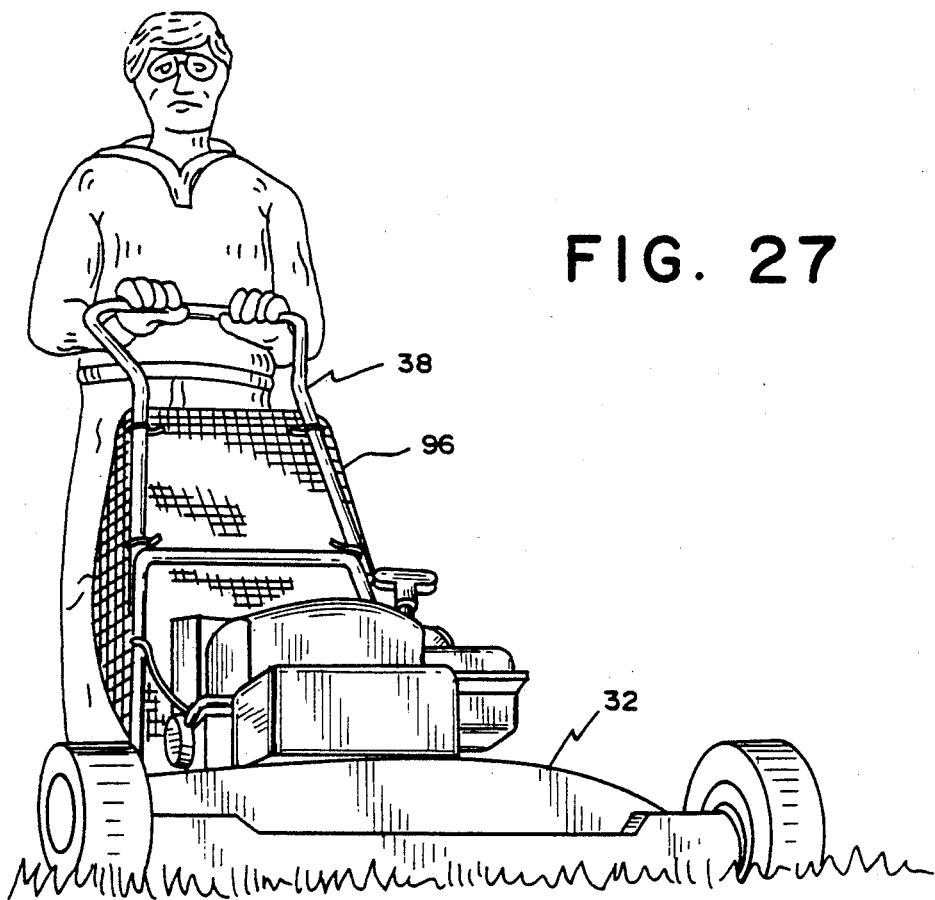
FIG. 27 is a schematic view showing the top panel of the cradle installed on the mower handlebars.

Panels 92, 94, and 96 are made of commercially available flexible plastic mesh with ½ inch openings. Grass clippings, for example, will not properly fill bag 40 without adequate ventilation. Cradle assembly 90 not only supports the weight of bag 40 as it fills, it also provides proper ventilation. Moreover, panels 92 and 94, and especially top panel 96, provide protection to the user from debris which may pierce or otherwise pass through bag 40. As illustrated in FIG. 27, top panel 96 is pivotally mounted to mower handlebars 38 to permit removal and installation of bag 40.

Alternatively, back panel 94 may be provided with releasable fasteners such as Velcro, and bag 40 may be removed through the back of cradle assembly 90.

In the embodiment illustrated in FIG. 13, which is preferred for use with mower brands such as Sears and Honda, main panel 92 includes a flat bottom and two sides, which sides are substantially vertical when installed on mower 32. The embodiment illustrated in FIG. 14 is preferred for mower brands such as Snapper and Toro.

Additional advantages, modifications, and variations will be apparent to those skilled in the art. The invention in its broader aspects is, therefore, not limited to the specific details, representative apparatus, and illustrative examples shown and described. Accordingly, departures may be made from such details without departing from the scope or spirit of the present invention.

I claim:

1. A disposable bag adapted to be mounted on a lawn mower to receive grass clippings from a discharge opening of the mower, the bag comprising in combination:
a first substantially linear closed end having a width; and an opposite open mouth having a width smaller than the first closed end width, a substantially linear first side edge generally perpendicular to the first closed end extending from the closed end to the mouth, a second substantially linear side edges extending from the first closed and generally parallel to the first side edge, a third substantially linear side edge extending from the open mouth generally parallel to the first side edge, a second closed end extending from the second side edge to the third side edge, the second closed end having a width, the third side edge having a length smaller than the width of said second closed end, said bag being defined by two layers of flexible sheet material which when inflated in use assume a generally ellipsoidal shape, said sheet material being apertured sufficient to allow escape of air while at the same time allowing the bag to be filled with grass clippings in use, and wherein a portion of the bag lying between the first and third side edges adjacent the open mouth provide a reduced neck portion facilitating mounting and handling of the bag while also inhibiting escape of grass clippings from the bag.

2. The disposable bag defined in claim 1 wherein said sheet material is apertured to provide a plurality of spaced openings each having a dimension on the order of ¼ to ½ of an inch.

3. The disposable bag defined in claim 2 wherein spacing between said openings is on the order of one to two inches.

4. The disposable bag defined in claim 3 wherein said openings extend in spaced interrelationship substantially throughout the distance between the first and second closed ends.

5. The disposable bag in claim 13 wherein said first closed end has a width on the order of 26 inches, and the length of said first side edge is on the order of 33 inches.

6. The disposable bag defined in claim 5 wherein said sheet material is plastic on the order of two mils in thickness.

7. The disposable bag defined in claim 4 wherein said sheet material is plastic on the order of two mils in thickness.

8. The bag of claim 1, including
a surface, extending from the first closed end to the open mouth, having first and second portions and having ventilation holes in only the second portion of the surface.

9. The bag of claim 8, wherein the surface, when the bag is mounted to a lawn mower and inflated in use, defines an ellipsoid.

10. The disposable bag defined in claim 1 wherein said neck has a width on the order of but not exceeding the width dimension of the second closed end.

11. A disposable bag adapted to be mounted on a lawn mower or the like to receive grass clippings from a discharge opening of the mower, the bag comprising in combination; disposable flexible sheet material defining a space for receiving grass clippings, said sheet material including opposed walls joined to each other along their opposite edges, said walls being engageable with each other in a folded storage condition of the bag and being separable upon inflation during use, said bag having at one end thereof a neck projecting therefrom and defining an inlet communicating with said space, said neck being dimensioned to be mounted on an outlet opening of a lawn mower, said sheet material being apertured sufficient to allow escape of air from the bag while at the same time allowing the bag to be filled with grass clippings when in use, and wherein said neck is dimensioned to facilitate handling of the bag as well as to inhibit escape of grass clippings from the bag.

12. The disposable bag defined in claim 11 wherein said sheet material is apertured to provide a plurality of spaced openings on the order of ¼ to ½ of an inch.

13. The disposable bag defined in claim 12 wherein spacing between said openings is on the order of one to two inches.

14. The disposable bag defined in claim 13 wherein said openings extend in spaced interrelationship substantially throughout a length of the bag between opposite ends of the bag.

15. The disposable bag defined in claim 14 wherein one of the ends of the bag has a width on the order of 26 inches, and said length of the bag is on the order of 33 inches.

16. The disposable bag defined in claim 15 wherein said sheet material is plastic on the order of two mils in thickness.

17. The disposable bag defined in claim 14 wherein said sheet material is plastic on the order of two mils in thickness.

18. The disposable bag defined in claim 11 further including opposite walls of flexible sheet material configured such that upon inflation during use the walls will assume a generally ellipsoidal shape.

19. A connecting device for connecting a disposable grass collecting bag to a lawn mower or the like having a discharge port, comprising:
first, second, third, and fourth side walls connected to each other to define a passageway having opposite first and second end openings for passing airflow and entrained material from the first end opening to the second end opening, first mounting means fixed to at least one side wall for mounting the connecting device to a lawn mower, second mounting means for mounting the disposable bag to the connecting device in communication with the second end opening, said second mounting means including a flange adjacent the second end opening and an elastic cord located about said walls adjacent the flange, wherein the second end opening is larger than the first end opening, wherein the second end opening defines a plane, and the passageway is inclined with respect to the plane for redirecting the airflow passing from the first end opening to the second end opening.

20. The device defined in claim 19 further including means for positioning the elastic cord adjacent the flange.

21. The device defined in claim 19 wherein said first mounting means includes a generally horizontally extending bar having apertures for receiving mounting lugs on a lawn mower with the discharge port in alignment with said first end opening.

22. The device defined in claim 19 wherein said first mounting means includes opposed flanges on the device receivable in the discharge port of the lawn mower.

23. The device of claim 19,
wherein the first end opening and the second end opening are spaced apart by a first distance;
wherein the first and third walls are opposite each other and spaced apart by a second distance, and the second and fourth walls are opposite each other and spaced apart by a third distance; and
wherein the first distance is smaller than either of the second and third distances.

* * * * *